US006088636A

United States Patent [19]

Chigumira et al.

[11] Patent Number: 6,088,636

[45] Date of Patent: Jul. 11, 2000

[54] VEHICLE TRIP DATA COMPUTER

[76] Inventors: Ishmael Chigumira; Robin Chigumira, both of 2421 Deerfield Dr., Kennesaw, Ga. 30144

[21] Appl. No.: 08/613,461

[22] Filed: Mar. 11, 1996

[51] Int. Cl.[7] .............................. G06G 7/78; G06G 1/09; G06F 15/50; G01M 15/00

[52] U.S. Cl. ............................. 701/26; 73/117.3; 701/24; 701/35; 701/214

[58] Field of Search .................................... 701/1, 24, 25, 701/26, 35, 58, 63, 214, 215; 73/116, 117.2, 117.3, 118.1, 113, 114

[56] References Cited

U.S. PATENT DOCUMENTS

| | | | |
|---|---|---|---|
| 4,564,905 | 1/1986 | Masuda et al. | 701/1 |
| 4,677,429 | 6/1987 | Glotzbach | 340/711 |
| 4,685,061 | 8/1987 | Whitaker | 701/35 |
| 4,875,167 | 10/1989 | Price et al. | 701/35 |
| 4,897,642 | 1/1990 | DiLullo et al. | 701/1 |
| 4,907,159 | 3/1990 | Mauge et al. | 701/1 |
| 4,939,652 | 7/1990 | Steiner | 701/35 |
| 5,046,007 | 9/1991 | McCreary et al. | 701/35 |
| 5,267,159 | 11/1993 | O'Neall | 701/35 |
| 5,450,321 | 9/1995 | Crane | 701/35 |
| 5,557,524 | 9/1996 | Maki | 701/35 |
| 5,600,558 | 2/1997 | Mearek et al. | 701/35 |
| 5,635,924 | 6/1997 | Tran et al. | 701/1 |
| 5,806,018 | 9/1998 | Smith et al. | 701/26 |
| 5,832,394 | 11/1998 | Wortham | 701/1 |

FOREIGN PATENT DOCUMENTS

WO 92/13738 8/1992 WIPO .

*Primary Examiner*—George Dombroske
*Attorney, Agent, or Firm*—Richard C. Litman

[57] ABSTRACT

A vehicle trip information manipulation device capable of collecting and recording travel related data from a motor vehicle and receiving broadcast data enabling computation of real time factors. The data collected and recorded includes the time and date of each trip, the beginning and ending odometer reading of each trip, the maximum, minimum, and average speed of the trip, and the fuel and maintenance information for the vehicle. The received information may include traffic reports, connecting travel information such as flight status, and various other business data. The invention also includes a means for downloading the collected data to an external device, such as a computer or a printer.

11 Claims, 2 Drawing Sheets

VEHICLE TRIP DATA COMPUTER

BACKGROUND OF THE INVENTION

1. Field of the Invention

The present invention relates to generally to electrical computers and data processing systems, and more particularly, to vehicle guidance, operation and indication systems. Most particular, the instant invention relates to an information processing system mounted in a vehicle for monitoring, collecting, recording and displaying vehicle usage information generated by the vehicle driver and vehicle function sensors.

2. Description of the Prior Art

Computer devices for recording the number of miles travelled for specific purposes have been developed in part to meet the recording requirements of various tax laws. Example of such a devices include the mileage recording and display apparatus disclosed in U.S. Pat. No. 5,267,159, issued Nov. 30, 1993, to D. L. O'Neall, and the vehicle movement monitoring system disclosed in U.S. Pat. No. 4,685,061, issued Aug. 4, 1987, to C. D. Whitaker. U.S. Pat. No. 4,875,167, issued Oct. 17, 1989, to J. W. Price et al. also shows a device for recording trip times, dates, and odometer readings.

U.S. Pat. No. 5,046,007, issued Sep. 3, 1991, to S. F. McCreary et al. shows a device for collecting vehicle trip data which includes means for downloading the collected data directly to a microcomputer. U.S. Pat. No. 4,939,652, issued Jul. 3, 1990, to J. Stiener also show a device for storing trip data in manner by which it can be transferred to a computer by a number of different transfer means.

Devices which provide a vehicle operator with information, either stored or calculated, have also been developed. For example, U.S. Pat. No. 4,677,429, issued Jun. 30, 1987, to R. W. Glotzbach shows a device with a convenient interface for displaying recorded trip data useful to the operator. WIPO International Publication No. WO 92/13738, published Aug. 20, 1992, discloses a safety data computation device for calculating and displaying safe maximum speeds and minimum braking distances.

None of the above devices combines a motor vehicle trip data recording device with means for receiving and transmitting current data for use in calculating and displaying useful trip parameters updated by current data, thus none of the above inventions and patents, taken either singly or in combination, is seen to describe the instant invention as claimed.

SUMMARY OF THE INVENTION

The trip data computer of the present invention accepts, stores, calculates, and supplies a wide variety of data relating to the travel of a specific motor vehicle. Input data is collected from vehicle function sensors and from operator input. This input data is combined with data stored in the computer memory and with data received from external systems. This variety of accessible data provides an operator with a comprehensive range of useful information.

The trip data computer is particularly useful to vehicle operators who make a large number of trips, such as travelling salesmen, on site repairmen, delivery drivers, and anyone who frequently changes location. Such users generate a large amount of vehicle data which should be recorded for business and other purposes. However, of further importance, such data when combined with stored data, such known routes and destinations, and data received from external sources, such as current weather or traffic conditions, provides for calculation of comprehensive accurate information. For example, average speed data calculated from data received from a speed sensor combined with destination data selected from memory and current traffic and weather information retrieved from an external source allows the trip data computer to calculate an accurate time of arrival. The trip data computer is thus able to calculate and display realistic predictions where heretofore only rough estimates were available. For instance, a user can accurately determine if he can catch the next flight to specific city by taking in to account data such as flight delays and the best route to the airport given current traffic conditions. Additionally, the trip data computer can transmit current vehicle operational data to a central office allowing managers of vehicle fleets to most efficiently route their vehicles by taking into account current vehicle conditions and accurate past histories of their vehicles and drivers.

The ability of the trip data computer to receive data from an external source provides the operator with current information necessary to perform most efficiently. Current data regarding changing conditions such as traffic and weather can be sent to the trip data computer. Data regarding the specific vehicle and operator such as current routing information can be sent to the each individual vehicle of a fleet. Also, data such as the location of the nearest fuel stop, hospital, local contact, etc. can be updated should the vehicle travel to different new region for which the trip data computer lacks stored data. Data regarding past trip of the vehicle are automatically stored in the trip data computer and are available for use in calculating future predictions.

The trip data computer includes a microcontroller for manipulating and storing vehicle data. A display provides information to the operator. The operator inputs data and controls the device through an operator interface device such as a keypad, touch screen, or voice controller. A data/power input port is used to connect the microcontroller to a source of power and to vehicle function sensors which report the state of the vehicle, such the speed of travel. A clock module provides the microcontroller with a time signal. A pager module provides current data to the microcontroller whenever necessary. The trip data computer may also optionally include a battery or an auxiliary power port for providing power to the microcontroller when the data/power port is unavailable functioning as a power supply. A Global Positioning System (GPS) receiver interface may be included for providing a source of continuous and accurate positioning data. Further for providing data output to external systems a cellular link interface or a RF transponder may be included.

Accordingly, it is a principal object of the invention to provide vehicle trip computer for storing and calculating comprehensive vehicle trip information with the ability to receive data from a paging system.

It is another object of the invention to provide a trip data computer with the ability to receive current information of particular use to the occupants of the vehicle while under way.

It is a further object of the invention to provide for convenient user input, information display, and data upload and download.

Still another object of the invention is to provide for data output to remote systems through a cellular phone.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
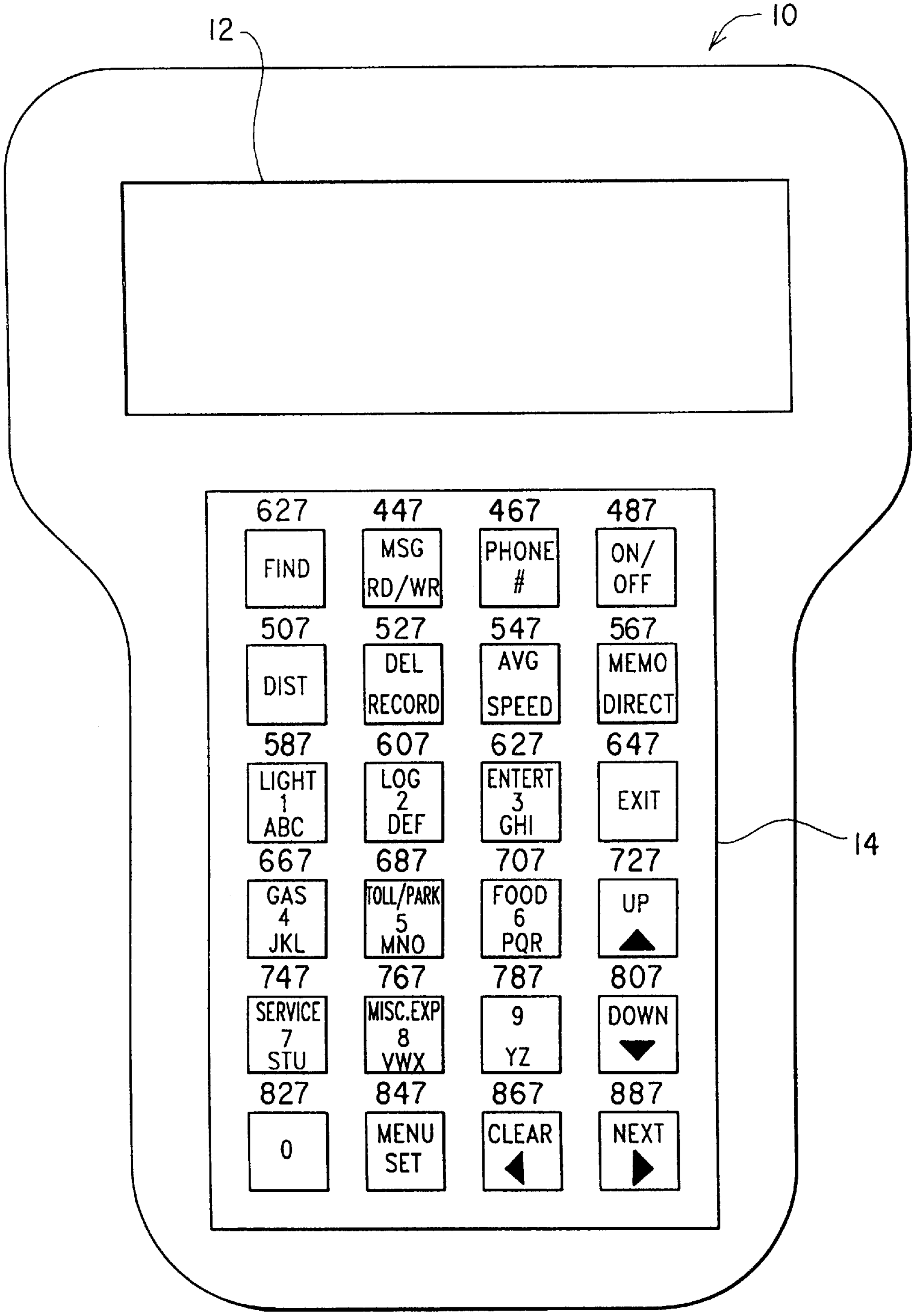
FIG. 1 is a front view of trip data computer of the present invention.

The vehicle trip data computer 10 of the present invention is shown in FIG. 1. The trip data computer 10 is dimensioned and configured to be installed in a motor vehicle within convenient reach and sight of the vehicle operator. Trip data computer 10 is small enough to allow removal from the vehicle for security, convenience, or to directly interface with a remote computer. Trip data computer includes a display module including an alphanumeric display 12. The display 12 provides means for displaying requested information and verifying operator input. A 4×20 LCD display is suitable for this purpose. A 4×6 keypad 14 functions as an operator interface device allowing the operator to input data and to control trip data computer 10.

Figure 2:
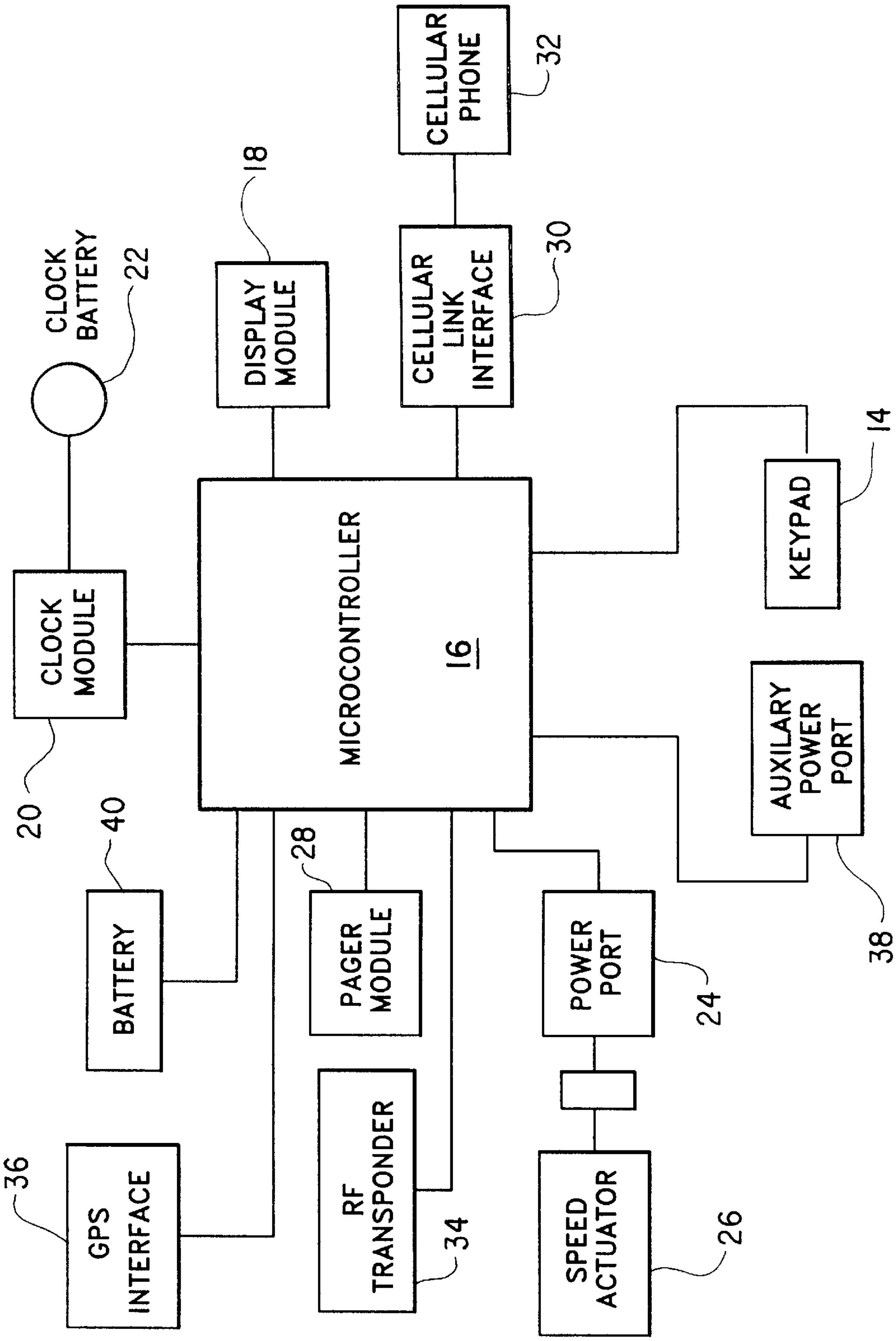
FIG. 2 is a diagrammatic view of the components of the present invention.

The components of trip data computer 10 are shown in diagrammatic form in FIG. 2. Trip data computer 10 includes a microcontroller 16. Linked to central microcontroller 16 are the modules and interfaces enabling trip data computer to receive, process, and output the wide variety of information useful to the vehicle operator. Microcontroller 16 includes sufficient memory to store both non-variable data related to the region of vehicle operation and variable data related to current conditions. Keypad 14 is connected to microcontroller 16 to provide input data and operator commands to microcontroller 16. Display module 18, which includes display 12, is connected to microprocessor 16 to supply information output to the operator and to supply operator interface information. A clock module 20 provides a time signal to microprocessor 16. Clock module 20 is powered by lithium battery 22 to maintain an accurate time signal in the event power is lost by microcontroller 16.

Microcontroller 16 is connected to the vehicle through data/power port 24. Data/power port 24 is a DB-9 connector which is configured for connection with standard RS232 serial data ports. However, power port 24 includes unique connections with a mating data/power port installed in the vehicle. The mating connector installed in the vehicle is connected to a vehicle power supply and accepts digital data from the microprocessor system onboard most modern vehicles. Microcontroller 16 receives vehicle operational data including at least vehicle speed data through power port 24. Other data related to the vehicle may also be supplied if available or required by the operator. If the vehicle does not include a data system from which the desired operational data can be obtained, function sensors are installed in the vehicle such as a speed actuator 26. A typical Hall effect sensor is adequate for speed actuator 26, however, to eliminate wiring difficulties, a coded RF speed sensing module may be used transmit speed data to microcontroller 16 without requiring addition wiring.

A pager module 28 is connected to microcontroller 16 through a serial link. Pager module 28 provides data regarding current conditions to microcontroller 16. Pager module 28 receives RF data from a paging service provider. Upon the receipt of data, pager module 28 sends a signal to microcontroller 16. The received data is then transferred through the serial link to microcontroller 16. Data which is provided through pager module 28 includes current traffic and weather data, allowing microcontroller to calculate accurate arrival times based on current conditions. With such data it is possible for trip data computer 10 to give alternate routes, or even to rearrange the order of destinations to minimize travel time given current conditions. The pager service may transmit general data to be received and used by all trip data computers 10 in an area. The pager service may also transmit coded data that the trip data computer of only a specific vehicle will receive allowing specific data such as an additional stop to be added to the planned route of a specific vehicle.

A number of other optional features may be connected to microcontroller 16 to enhance the utility of trip data computer 10. A cellular link interface 30 may be connected to microcontroller 16. Cellular link interface 30 allows the operator and microcontroller 16 to output information to external systems through a cellular phone 32. Through the use of cellular link interface 30 an operator has the ability to contact an external information provider to request certain desired data to sent to pager module 28. Data can also be uploaded from microcontroller 16 through cellular link interface 30. Microcontroller 16 may be programmed to upload data to a location such as a central office at set times or if certain conditions are met. An example of such a condition would be exceeding a maximum speed. Through pager module 28 the microcontroller may also be sent instructions to upload information through cellular link interface 30 when desired by external parties with required codes.

Another device that may be connected with microcontroller 16 to output data is RF transponder 34. RF transponder 34 allows microcontroller 16 to transmit certain vehicle data to nearby local receivers. Such data may be monitored by parties such as traffic police or toll collectors. Data recorders may also be installed in locations such as traffic signals at dangerous intersections to record data from vehicles as they enter the intersection. Such data may then be compared to a record of the traffic signal to determine the cause of accidents occurring at the intersection. RF transponder is equipped to receive request signals from such roadside devices and transmit the requested information.

A GPS interface 36 may also be connected to microcontroller 16 to provide data regarding the location of the vehicle. Such data allows the microcontroller to accurately predict such important information such as the best route to a particular destination even when the driver does not know his location. Positioning data from GPS interface 36 may also be transmitted through cellular link interface 30 allowing the position of the vehicle to monitored when desired, such as in the event of vehicle theft.

Microcontroller 16 may also be connected to an optional auxiliary power port 38. As discussed above, power port 24 may be connected directly to an RS232 port on an external computer for uploading and downloading data to microcontroller 16. Auxiliary power port 38 is used during such transfers to provide power to microcontroller 16. A battery 40 may also be connected to microcontroller 16 for providing limited power to access data when trip data computer 10 is not connected to an external power source.

To use trip data computer 10 an operator accesses the features of the device through keypad 14. Key 42 permits a user to search through lists of data such as messages, phone numbers, memos, or directions. Key 44 permits display incoming messages from pager module 28. Key 46 permits a user to enter and retrieve phone numbers. Key 48 is used to turn on and off trip data computer 10. When turned off the pager module 28 may either also be turned or may be left on. Key 50 permits a user to enter and display distances to designated destinations. This information may also be transferred to trip data computer from an external source. Key 52 permits a user to delete data from the memory of microcontroller 16. Key 54 permits a user to display the results of calculations determining the average speed of the vehicle, predicted arrival time, distance travel, and distance remaining. Key 56 permits a user to toggle between viewing memo data and trip data. Key 58 permits control of the back lighting of display 12. Key 60 permits a user to label recorded trip data with a specific purpose code, such a business or personal. Key 62 permits a user to enter entertainment expense records. Key 64 permits a user to abort a current operation. Key 66 permits a user to enter fuel records. Key 68 permits a user to enter toll and parking records. Key 70 permits a user to enter meal expense records. Key 74 permits a user to enter service expense records. Key 76 permits a user to enter other miscellaneous records. Key 84 permits a user to set calibration parameters, to set the time and date, to upload and download data, and to preview recorded data. Keys 58–62, 66–70, 74–78, and 82 also permit a user to input alphanumeric characters. Keys 72, 80, 86, and 88 permit a user to scroll through and edit information on display 12.

It is to be understood that the present invention is not limited to the sole embodiment described above, but encompasses any and all embodiments within the scope of the following claims.

I claim:

1. A vehicle trip data computer for installation in motor vehicle to provide an operator with comprehensive trip data, said vehicle trip data computer comprising:

at least one function sensor for sensing vehicle operational data during vehicle operation;

a microcontroller which accepts, stores, manipulates, and supplies, vehicle trip data based on said vehicle operational data;

a display module connected to said microcontroller for supplying output data and operator interface information;

a data input port interconnected between said at least one function sensor and said microcontroller for supplying said microcontroller with said vehicle operational data;

an operator interface device providing means for the operator to control and input data to said microcontroller; and a pager module connected to said microcontroller for receiving RF data from paging service providers, said RF data received by said pager module including data of current conditions used by said microcontroller to calculate accurate predictive vehicle trip data based on said vehicle operational data.

2. The vehicle trip data computer of claim 1, further including a cellular link interface connected to said microcontroller, said cellular link interface for connecting said microcontroller with a cellular phone to permit said microcontroller to supply vehicle trip data to an external system.

3. The vehicle trip data computer of claim 1, further including a global positioning system interface connected to said microcontroller, said global positioning system interface for providing said microcontroller with current positional data.

4. The vehicle trip data computer of claim 1, further including a RF transponder connected to said microcontroller, said RF transponder for transmitting selected vehicle trip data to local receivers.

5. The vehicle trip data computer of claim 1, wherein said operator interface device includes a keypad.

6. The vehicle trip data computer of claim 1, wherein said data input port is configured for connection with a speed actuator providing said microcontroller with vehicle speed data through said data input port.

7. The vehicle trip data computer of claim 6, wherein said data input port is a DB-9 power port configured to enable said microcontroller to upload and download data directly to an external computer through said data input port.

8. The vehicle trip data computer of claim 1, wherein said data input port is a DB-9 power port configured to enable said microcontroller to upload and download data directly to an external computer through said data input port.

9. The vehicle trip data computer of claim 1, further including an auxiliary power port for connection with an external power supply.

10. A vehicle trip data computer for installation in motor vehicle to provide an operator with comprehensive trip data, said vehicle trip data computer comprising:

at least one function sensor for sensing vehicle operational data during vehicle operation;

a microcontroller which accepts, stores, manipulates, and supplies vehicle trip data based on said vehicle operational data;

a display module connected to said microcontroller for supplying output data and operator interface information;

a clock module connected to said microcontroller for providing time data to said microcontroller, said clock module including a battery for providing said clock module with continuous operating power;

a DB-9 power port interconnected between said at least one function sensor and said microcontroller for supplying said microcontroller with said vehicle operational data, and for providing said microcontroller with means for data input, data output, and power input;

a keypad connected to said microcontroller for inputting data and operator commands to said microcontroller;

a battery connected to said microcontroller for providing said microcontroller with continuous power;

a GPS interface connected to said microcontroller for providing positional data to said microcontroller;

a pager module connected to said microcontroller for providing current data conditions used by said microcontroller to calculate accurate predictive vehicle trip data based on said vehicle operational data;

a cellular phone for uploading data from said microcontroller;

a cellular link interface interconnecting said cellular phone and said microcontroller;

an auxiliary power port for providing power to said microcontroller when power is not supplied through said DB-9 power port; and an RF transponder for transmitting data from said microcontroller.

11. A vehicle trip data computer according to claim 10, wherein said at least one function sensor includes a speed actuator for sensing vehicle speed data during vehicle operation.

* * * * *